(12) United States Patent
Lecuyer et al.

(10) Patent No.: US 8,661,641 B2
(45) Date of Patent: Mar. 4, 2014

(54) ROTOR BLADE ASSEMBLY TOOL FOR GAS TURBINE ENGINE

(75) Inventors: Joseph Daniel Lecuyer, Verdun (CA); Bruno Chatelois, Boucherville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 223 days.

(21) Appl. No.: 13/284,401

(22) Filed: Oct. 28, 2011

(65) Prior Publication Data

US 2013/0104398 A1 May 2, 2013

(51) Int. Cl.
*B23Q 3/00* (2006.01)
*B25B 27/14* (2006.01)

(52) U.S. Cl.
USPC ............. 29/281.1; 29/271; 29/281.6; 29/466; 29/889.21; 416/248

(58) Field of Classification Search
USPC ........ 29/271, 281.1, 281.6, 466, 700, 889.21; 416/248
See application file for complete search history.

(56) References Cited

U.S. PATENT DOCUMENTS

| | | | |
|---|---|---|---|
| 3,522,645 A | 8/1970 | Kennicott | |
| 3,628,922 A | 12/1971 | Sprenger | |
| 3,668,773 A | 6/1972 | Achterberg | |
| 3,691,618 A | 9/1972 | Achterberg et al. | |
| 3,977,062 A | 8/1976 | Wallman | |
| 5,174,720 A | 12/1992 | Gradl | |
| 6,041,500 A | 3/2000 | Terpstra | |
| 7,353,588 B2 | 4/2008 | Crain et al. | |
| 7,694,417 B2 | 4/2010 | Crain et al. | |
| 2007/0248455 A1 | 10/2007 | Workman et al. | |
| 2009/0155068 A1* | 6/2009 | Durocher et al. | 415/209.2 |
| 2009/0317245 A1 | 12/2009 | Burns et al. | |

\* cited by examiner

*Primary Examiner* — Alexander P Taousakis
(74) *Attorney, Agent, or Firm* — Norton Rose Fulbright Canada LLP

(57) ABSTRACT

A rotor blade assembly tool for coupling a plurality of circumferentially spaced rotor blades to a rotor disc of a turbine rotor assembly, includes a base ring with an array of circumferentially spaced resilient fingers axially extending from the base ring. The resilient fingers are configured each to radially abut a blade seal, damper or other engine component against radially inner facing surfaces of platforms of the respective blades when the blades are being seated onto the disc during an assembly procedure.

11 Claims, 6 Drawing Sheets

ROTOR BLADE ASSEMBLY TOOL FOR GAS TURBINE ENGINE

TECHNICAL FIELD

The application relates generally to gas turbine engines, and more particularly to a method and apparatus for assembly of gas turbine engine rotor assemblies.

BACKGROUND OF THE ART

Gas turbine engines generally include rotor assemblies such as a compressor rotor and turbine rotor. A rotor assembly usually includes at least one row of circumferentially spaced rotor blades extending radially outwardly from a rotor disc to respective blade tips. Each rotor blade includes an airfoil having a pressure side and a suction side, connected together at leading and trailing edges. Each airfoil extends radially outwardly from a rotor platform which extends circumferentially in opposed directions. Each rotor blade also includes a blade root in a dovetail shape that extends radially inwardly from the platform and is received in one of a plurality of circumferentially spaced dovetail slots in the periphery of the rotor disc. In some rotor assemblies, particularly in turbine rotors, seal or damper members may be provided within a plurality of cavities located radially between the periphery of the disc and the platforms of the rotor blades and circumferentially between adjacent rotor blades. These seal or damper members seal gaps between adjacent platforms or absorb vibrations of the rotor blades during engine operation. Those seal and/or damper members must be installed together with the rotor blades onto the rotor disc in a rotor blade assembly procedure. This can be a challenging task.

Accordingly, there is a need to provide an improved method and apparatus for rotor blade assembly for gas turbine engines.

SUMMARY

In one aspect, there is provided a rotor blade assembly tool for coupling a plurality of circumferentially spaced rotor blades to a rotor disc of a turbine rotor, wherein each rotor blade extends from the rotor disc to a radially outer blade tip and includes a platform extending from the rotor blade in opposed circumferential directions, a plurality of components are each disposed radially between the respective platforms of the rotor blades and the disc, and circumferentially between adjacent said rotor blades, the tool comprising: a base ring; and an array of circumferentially spaced resilient fingers supported on the base ring, the fingers extending in a substantially axial direction and being configured to radially abut the components against a radially inner facing surface of the platforms, respectively, when the rotor blades are installed on the rotor disc, each of the fingers having a maximum thickness in a radial direction with respect to the rotor blade assembly, smaller than a radial clearance between the disc and a land of the respective platforms.

In another aspect, there is provided a method of assembling a rotor assembly for a gas turbine engine, the method comprising: providing a plurality of rotor blades each including a root and a platform, the platform extending from the blade in opposed circumferential directions; providing a rotor disc including a plurality of slots spaced circumferentially about the disc; providing a plurality of blade seal members for sealing circumferential gaps between adjacent said platforms when the rotor blades are installed on the rotor disc; partially inserting the roots of the rotor blades in the respective slots of the rotor disc; placing the respective seal members radially between the platforms and the rotor disc, each seal member being positioned circumferentially between adjacent said rotor blades using a tool having an array of circumferentially spaced resilient fingers radially abutting the respective seal members against radially inner facing surfaces of the platforms; seating the rotor blades in the respective slots of the rotor disc substantially simultaneously with attachment of the respective seal members to the platforms, by a relative movement between the rotor disc and the tool having the rotor blades with the attached seal members, thereby forming the rotor assembly; and then moving the tool away from the rotor assembly to withdraw the respective resilient fingers from a radial clearance between the rotor disc and respective lands of the platforms with the blade seal members remaining in respective platform cavities radially between the platforms and the disc and circumferentially between adjacent blades.

In a further aspect, there is provided a method of assembling a rotor assembly for a gas turbine engine, the method comprising: providing a plurality of rotor blades each including a root and a platform, the platform extending from the blade in opposed circumferential directions; providing a rotor disc including a plurality of slots spaced circumferentially about the disc; positioning and removably securing the respective rotor blades to a tool in a blade array in which the rotor blades are circumferentially spaced one from another to correspond with a blade distribution pattern of the rotor assembly; positioning the tool with the rotor blades held thereon to circumferentially align the roots of the rotor blades with the respective slots of the rotor disc; and seating the rotor blades in the respective slots of the rotor disc substantially simultaneously, by a relative movement between the rotor disc and the tool holding the rotor blades, thereby forming the rotor assembly; and then withdrawing the tool from the rotor assembly.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

It will be noted that throughout the appended drawings, like features are identified by like reference numerals.

DETAILED DESCRIPTION

Figure 1:
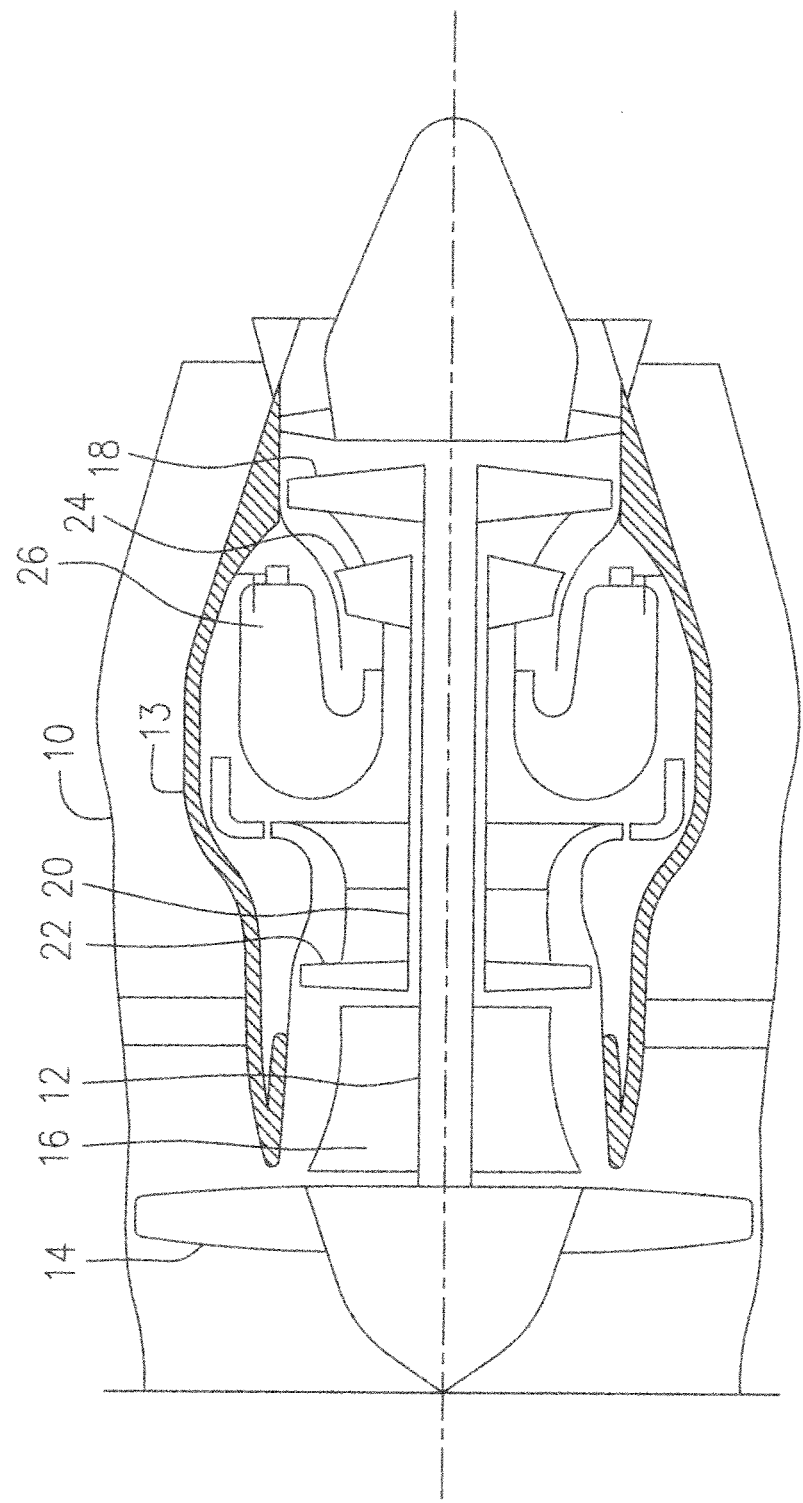
FIG. 1 is a schematic cross-sectional view of a turbofan gas turbine engine as an example illustrating an application of the described subject matter.

FIG. 1 illustrates a gas turbine as example of the application of the described subject matter which includes a housing or nacelle 10, a core casing 13, a low pressure spool assembly seen generally at 12 which includes a fan assembly 14, a low pressure compressor assembly 16 and a low pressure turbine assembly 18 and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not numbered) therethrough including a combustor 26.

Figure 8:
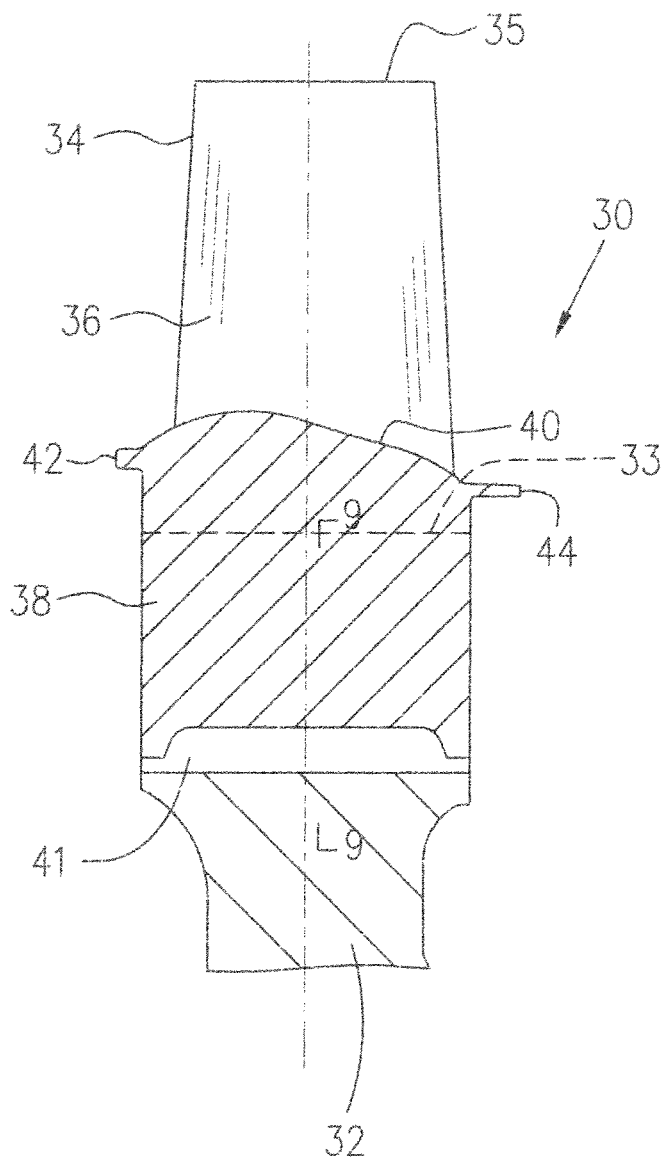
FIG. 8 is a schematic partial cross-sectional view of a turbine rotor assembly which may be used in the engine of FIG. 1.

Referring to FIGS. 1 and 8-10, a rotor assembly, for example a turbine rotor assembly 30 which may be in one rotor stage of the high pressure turbine assembly 24, is described herein to illustrate an exemplary configuration of a rotor assembly, as an application of the described subject matter. The turbine rotor assembly 30 includes a turbine rotor disc 32 mounted on a rotating shaft (not numbered) of the high pressure spool assembly 20. The rotating shaft is rotatable about a longitudinal axis (not numbered) of the engine, which is also the longitudinal axis of the turbine rotor assembly 30. An array of circumferentially spaced rotor blades 34 (only one is shown in FIG. 8) extend radially outwardly from a periphery 33 of the rotor disc 32 to a blade tip 35. Each of the rotor blades 34 includes an airfoil section 36, a root section 38 and a platform segment 40 which extends laterally (in opposed circumferential directions) from opposed sides of the airfoil section 36 into opposing relationship between corresponding platform segments 40 of adjacent rotor blades 34.

The root section 38 of the rotor blade 34 may include projections in a multi-lobed type, which is often referred to as a "firtree", because of this characteristic shape.

The rotor disc 32 further includes a plurality of attachment slots 41 circumferentially spaced apart one from another and extending axially through the periphery 33 of the rotor disc 32. The axial attachment slot 41 includes axial recesses (not numbered) defined in opposite side walls of the slot 41. The axial recesses substantially conform in both shape and direction to the firtree of the root section 38. The root section 38 can be slid for example from a front side of the rotor disc 32 into the axial attachment slot 41 when the rotor blade 34 is mounted on the rotor disc 32 in a turbine rotor assembly procedure, which will be further described hereinafter.

Figure 4:
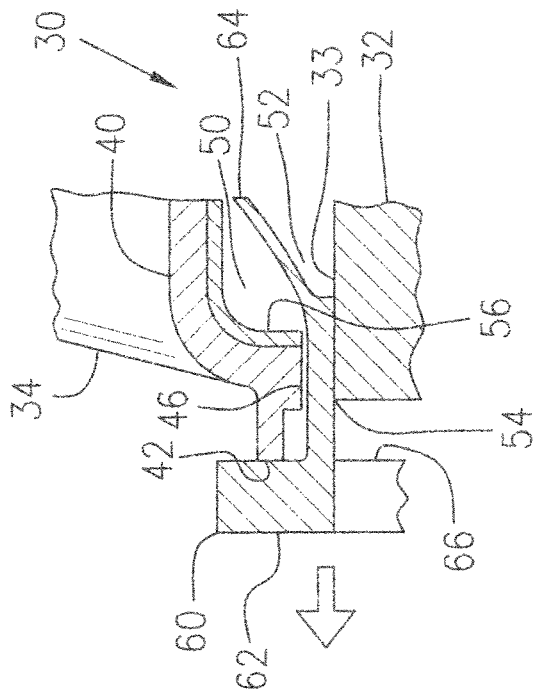
FIG. 4 is a partial cross-sectional view of the turbine rotor assembly of FIG. 3, showing a radial gap between the rotor disc and a front land of a rotor blade platform.
Figure 10:
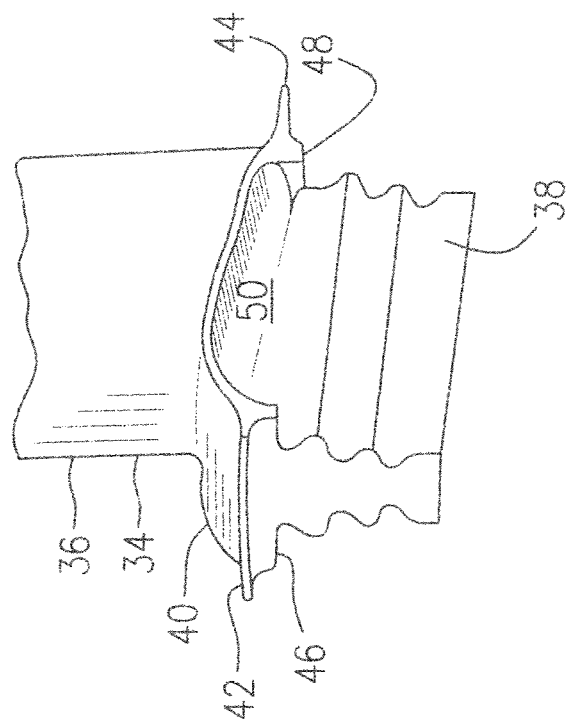
FIG. 10 is a partial perspective view of the rotor blade of the turbine rotor assembly of FIG. 8.
Figure 9:
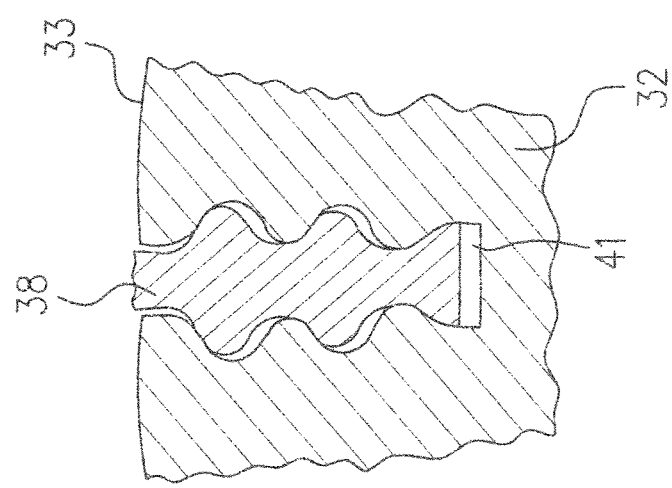
FIG. 9 is a schematic partial cross-sectional view of the turbine rotor assembly, taken along line 9-9 in FIG. 8, showing a root section of a turbine blade seated in a slot of the rotor disc.

Referring to FIGS. 4 and 10, the platform 40 of each rotor blade 34 may be configured in a curved profile, extending axially between a front edge 42 and a rear edge 44, with a front land 46 and a rear land 48 which extend radially inwardly from the platform 40 and are axially spaced apart one from another at each side of the root section 38, thereby defining respective platform recesses 50 at opposed sides of the root section 38. When the rotor blades 34 are installed on the rotor disc 32, the platforms 40 of adjacent rotor blades 34 circumferentially extend towards one another such that one of the platform recesses 50 of a rotor blade 34 and one of the platform recesses 50 of an adjacent rotor blade 34, in combination form a platform cavity 52 (see FIG. 4) which is located radially between the platforms 40 and the outer periphery 33 of the rotor disc 32, and circumferentially between adjacent rotor blades 34. A radial clearance 54 may be provided between the periphery 33 of the rotor disc 32 and each front land 46 of the respective platforms 40, which for example may allow cooling air to pass therethrough.

Figure 3:
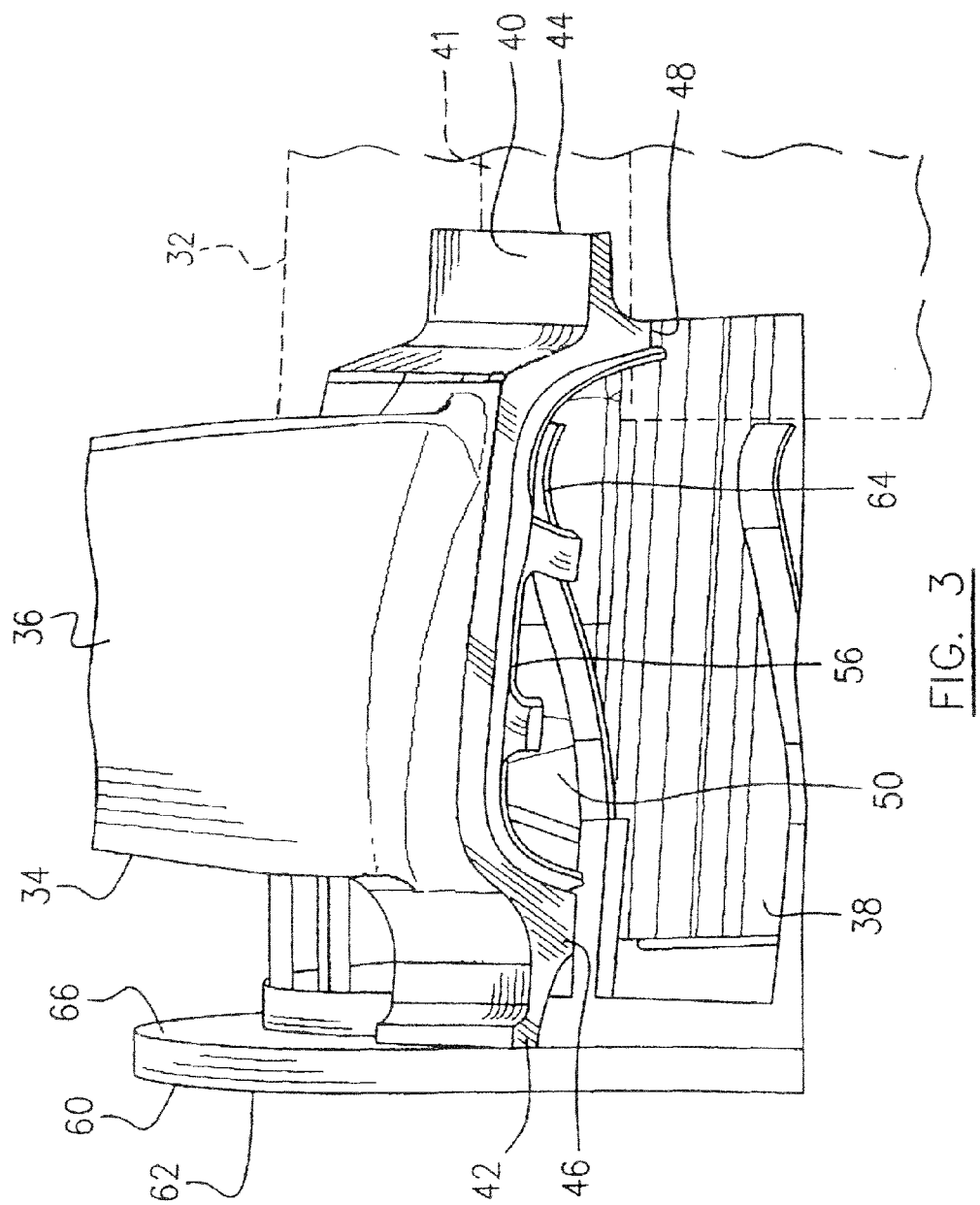
FIG. 3 is a partial perspective view of a rotor blade assembly tool according to another embodiment, in use during an assembly procedure of a turbine rotor, showing the tool supporting a seal member in position within the turbine rotor assembly.
Figures 5, 6, 7:
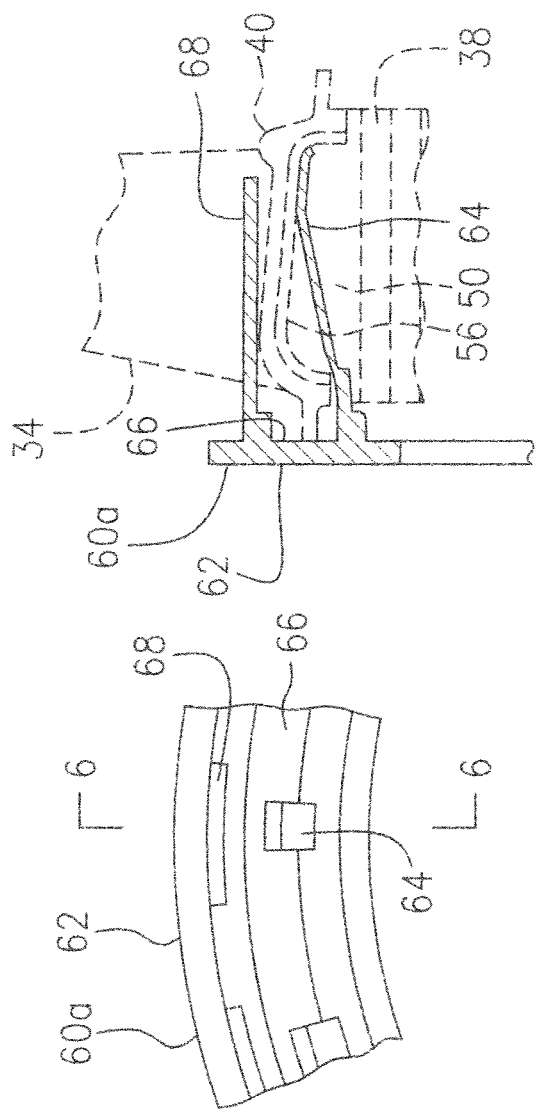
FIG. 5 is a partial front elevational view of a rotor blade assembly tool according to a further embodiment.
FIG. 6 is a cross-sectional view of the tool taken along line 6-6 in FIG. 5, showing the tool holding a rotor blade with an attached seal member thereon.
FIG. 7 is a top plane view of a seal member used in the turbine rotor assembly of FIG. 3.

Referring to FIGS. 3-4 and 7, a plurality of seal members 56 may be provided in the turbine rotor assembly 30. Each seal member 56 for example, may include a metal plate (not numbered) with laterally extending arms (not numbered) at respective opposed sides thereof. The seal member 56 may be bent in a curved shape to partially correspond with the curved configuration of the platform recess 50. Each seal member 56 is placed within the platform cavity 52 in the turbine rotor assembly 30, with laterally extending arms thereof restrained circumferentially between adjacent rotor blades 34. During engine operation a centrifugal force created by rotation of the turbine rotor assembly 30 forces the seal member 56 to radially abut radially inner facing surfaces (not numbered) of adjacent platforms 40, thereby sealing a circumferential gap 58 (see FIG. 7) defined between side edges of adjacent platforms 40.

Figure 2:
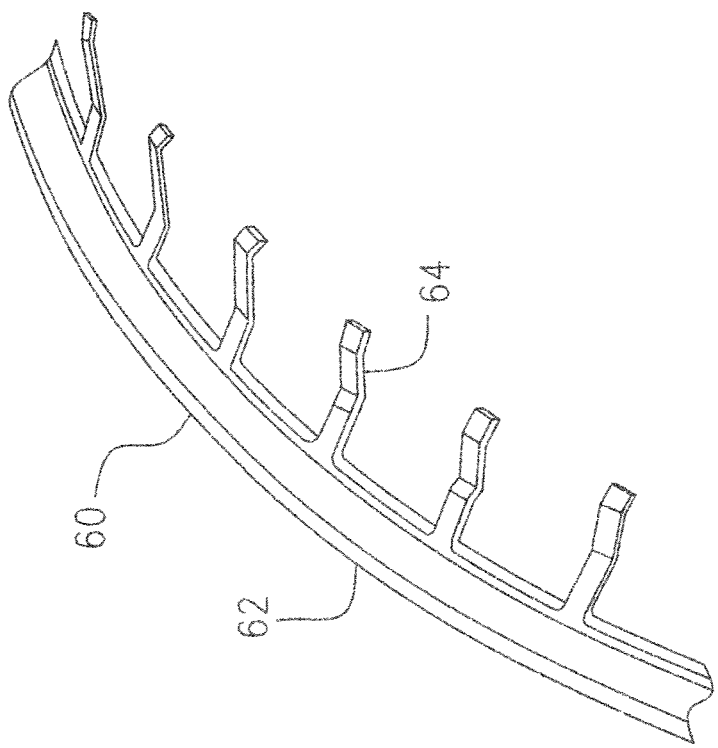
FIG. 2 is a partial perspective view of a rotor blade assembly tool according to one embodiment, which may be used for assembling a rotor blade assembly in the exemplary engine of FIG. 1.

Referring to FIGS. 2-4, a rotor blade assembly tool 60 is provided to facilitate the assembly procedure of the turbine rotor assembly 30. In accordance with one embodiment as shown in FIG. 2, the tool 60 may include a base ring 62 and an array of circumferentially spaced resilient fingers 64 supported on the base ring 62. The resilient fingers 64 extend in a substantially axial direction from the base ring 62 and are configured to radially abut the respective seal members 56 against the radially inner facing surfaces of the platforms 40, when the respective rotor blades 34 are installed on the rotor disc 32. The number of fingers 64 is equal to the number of blades 34 of the turbine rotor assembly 30 to be assembled.

Each finger 64 may be made of a curved spring band extending axially and radially outwardly from the base ring 62. The curved spring band has a maximum thickness in the radial direction of the rotor assembly, smaller than the radial clearance 54 between the outer periphery 33 of the rotor disc 32 and the respective front lands 46 of the platforms 40, in order to position the respective fingers 64 through the respective radial clearances 54 to support the seal members 56 in position within the platform cavity 52 when the respective rotor blades 34 are being installed on the rotor disc 32. The curved spring band of the finger 64 may be configured to provide a resilient deformation such that each finger 64 can be withdrawn from the platform cavity 52 through the radial clearance 54 when the tool 60 is moved away from a completed turbine rotor assembly 30, as shown in FIG. 4.

The base ring 62 may be formed as an integral ring or may be a segmented ring including a plurality of circumferential segments detachably connected one to another. The fingers 64 may be integrated with the base ring 62 or may be removably affixed to the base ring 62.

In accordance with another embodiment, as illustrated in FIG. 3, the base ring 62 may provide an engaging end which defines for example, a radially and circumferentially extending engaging surface 66 for axially abutting the front edge 42 of the respective platforms 40 during an assembly procedure of the turbine rotor assembly 30.

In a turbine rotor assembling procedure according to one embodiment, as illustrated in FIGS. 3, 4 and 7, the rotor blades 34 are partially installed to the rotor disc 32 by partially inserting the roots 38 of the rotor blades 34 into the respective slots 41 of the rotor disc 32. Therefore, the rotor blades 34 which are held on the rotor disc 32 substantially correspond to a rotor blade circumferential distribution pattern of the turbine rotor assembly 30. However, a significant portion of the platform 40 of each rotor blade 34, is suspended for example at the front side of the rotor disc 32 and the platform cavities 50 of the respective rotor blades 34 are all accessible in a radially outward direction (see FIG. 3). The tool 60 is then positioned, for example in a proximity of the leading edges 42 of the platforms 40 of the rotor blades 34, allowing the resilient fingers 64 to extend partially into the respective platform recesses 50, each finger 64 being positioned between corresponding adjacent rotor blades 34. The seal members 56 are then placed into the platform recesses 50 between each pair of adjacent rotor blades 34. Each curved and resilient finger 64 is resiliently deformable to allow the seal member 56 to be placed between the finger 64 and the platforms 40 of the adjacent rotor blades 34, and to then radially abut the seal member 56 against the radially inner facing surface of the platforms 40 of the adjacent rotor blades 34.

After all seal members have been placed in position, the tool 60 is moved toward the rotor blades 34 such that the radially and circumferentially extending engaging surface 66 of the base ring 62 abuts for example the front edges 42 of the platforms 40 of the rotor blades 34. The tool 60 is further moved toward the rotor disc 32 to push the roots 38 of the rotor blades 34 in a substantially simultaneous fashion, further into the respective slots 41 of the rotor disc 32 until the respective rotor blades 34 are completely seated on the rotor disc 32 (see FIG. 4). It should be noted that in the above-described procedure, all the seal members 56 are held in position by the spring forces of the respective fingers 64 and are therefore moved together with the rotor blades 34 to the final seating position on the rotor disc 32, thereby forming a rotor assembly with the tool 60 attached thereto.

As illustrated in FIG. 4, the platform recesses 50 between adjacent rotor blades 34 are closed by the periphery 32 of the rotor disc to form a platform cavity 52 between the rotor disc and the platforms 40 when the rotor blades are completely seated on the rotor disc 32. The fingers 64 of the tool 60 which are used during the rotor assembly procedure, extend into the respective platform cavities 52 through the respective radial clearances 54 defined between the periphery 33 of the rotor disc 32 and the front platform lands 46. As already described, each finger 64 has a maximum thickness to allow the finger 64 to extend through such a clearance 54 and has a resiliency for resilient deformation to allow the finger to be withdrawn from the platform cavity 52 through the radial gap 54 when the tool 60 is moved away indicated by the arrow in FIG. 4) from the rotor assembly 30, despite the axial and radially outward orientation and the curved configuration of the finger 64. The rotor assembly procedure is completed when the tool 60 has been moved away.

In FIGS. 5 and 6, a tool 60a according to another embodiment, is provided. Similar to the tool 60 in FIG. 3, the tool 60a includes a base ring 62 with an engaging end defining a radially and circumferentially extending engaging surface 66, and an array of circumferentially spaced resilient fingers 64 extending axially and radially outwardly from the base ring 62, which will not be further described to avoid redundancy.

Additionally, the tool 60a further includes an array of circumferentially spaced positioning members 68 supported on the base ring 62 and disposed around the array of the circumferentially spaced fingers 64, for holding the respective rotor blades 34 in position according to a blade distribution pattern when the rotor blades 34 are being coupled to the rotor disc 32. For example, each positioning member 68 may also be configured in a resilient configuration to have a respective circumferential width for contacting adjacent rotor blades 34 such as the airfoil sections (not numbered) thereof, and to apply frictional forces thereto to hold the rotor blades 34 in such a blade distribution pattern. Alternatively, the positioning member 68 may be disposed radially outwardly away from a corresponding finger 64 by an appropriate space such that the platform 40 (with or without seal member 56) can be radially restrained between the fingers 64 and the positioning member 68, the rotor blades 34 being thereby held in position by the tool 60a to form the required blade distribution pattern for a turbine rotor assembly procedure, as shown in FIG. 6.

According to a further embodiment, a turbine rotor assembly procedure may be completed using tool 60a to eliminate a step of partially installing the rotor blades 34 on the rotor disc 32 as described with reference to FIG. 3. Instead of partially inserting the roots 38 of the rotor blades 34 in the respective slots 41 of the rotor disc 32 (as shown in FIG. 3), the rotor blades 34 according to this embodiment are positioned on the tool 60a and are removably secured thereto as described above with reference to FIG. 6, in order to form a blade array in which the rotor blades 34 are circumferentially spaced one from another, corresponding with a blade distribution pattern of the rotor assembly. The tool 60a together with the rotor blades 34 held thereon, is then positioned to circumferentially align the roots 38 of the blades 34 with the respective slots 41 of the rotor disc 32. The tool 60a and the rotor blades 34 held thereon are then moved towards the rotor disc 32 for seating the rotor blades 34 in the respective slots 41 of the rotor disc 32 in a substantially simultaneous procedure.

The above description is focused on the difference between the assembly procedures using different tools 60 and 60a. A step of placing the seal members 64 in position within the platform recesses 50 using tool 60a is similar to that step using tool 60. However, when tool 60a is used, the attachment of seal members 56 to the platforms 40 of the rotor blades 34, can be conducted after all the blades 34 are secured on the tool 60a, or can be conducted individually with each rotor blade 34 being positioned on the tool 60a. Tool 60a should be removed from the turbine rotor assembly when the turbine rotor assembly has been completed, similar to the tool withdrawing step previously described.

The above description is meant to be exemplary only, and one skilled in the art will recognize that changes may be made to the embodiments described without departure from the scope of the described subject matter. For example, the positioning members may be configured in various configurations which are adapted to hold the individual rotor blades on the tool, such as clamps for releasably engaging the leading edge portions of the blade platforms, etc. The seal members may be replaced with other engine components such as dampers which are positioned within the platform cavities for absorbing blade vibrations. The fingers of the tool may be configured for holding such damper components and seal members together in position if required. Still other modifications which fall within the scope of the described subject matter will be apparent to those skilled in the art, in light of a review of this disclosure, and such modifications are intended to fall within the appended claims.

The invention claimed is:

1. A rotor blade assembly tool for coupling a plurality of circumferentially spaced rotor blades to a rotor disc of a turbine rotor, wherein each rotor blade extends from the rotor disc to a radially outer blade tip and includes a platform extending from the rotor blade in opposed circumferential directions, a plurality of components are each disposed radially between the respective platforms of the rotor blades and the disc, and circumferentially between adjacent said rotor blades, the tool comprising:

a base ring; and an array of circumferentially spaced resilient fingers supported on the base ring, the fingers extending in a substantially axial direction and being configured to radially abut the components against a radially inner facing surface of the platforms, respectively, when the rotor blades are installed on the rotor disc, each of the fingers having a maximum thickness in a radial direction with respect to the rotor blade assembly, smaller than a radial clearance between the disc and a land of the respective platforms.

2. The tool as defined in claim 1 wherein the base ring comprises an engaging end for engaging respective rotor blades.

3. The tool as defined in claim 1 wherein each of the fingers comprises a curved spring band extending axially and radially outwardly from the base ring.

4. The tool as defined in claim 1 wherein each of the fingers is configured for resilient deformation to allow the finger to be withdrawn from the turbine rotor through the radial clearance between the disc and the land of the respective platforms.

5. The tool as defined in claim 1 wherein the base ring comprises a plurality of detachably connected circumferential segments.

6. The tool as defined in claim 1 wherein the resilient fingers are integrated with the base ring.

7. The tool as defined in claim 1 wherein the resilient fingers are removeably affixed to the base ring.

8. The tool as defined in claim 1 wherein the engaging end of the base ring comprises a radially and circumferentially extending surface for axially abutting a front edge of the respective rotor blades.

9. The tool as defined in claim 1 comprising an array of circumferentially spaced positioning members supported on the base ring and disposed around the array of the circumferentially spaced fingers, for holding the respective rotor blades in position corresponding to a blade distribution pattern, while the rotor blades are being coupled to the rotor disc.

10. The tool as defined in claim 9 wherein the positioning members are configured to have a respective circumferential width for contacting adjacent blades.

11. The tool as defined in claim 9 wherein the positioning members are radially spaced apart from the array of the circumferentially spaced fingers in order to radially restrain the platforms of the blades between the positioning members and the fingers.

* * * * *